US008273447B2

(12) United States Patent
Forloni

(10) Patent No.: US 8,273,447 B2
(45) Date of Patent: Sep. 25, 2012

(54) MULTILAYER ORIENTED FILM

(75) Inventor: Roberto Forloni, Rho (IT)

(73) Assignee: Cryovac, Inc., Duncan, SC (US)

( * ) Notice: Subject to any disclaimer, the term of this patent is extended or adjusted under 35 U.S.C. 154(b) by 779 days.

(21) Appl. No.: 12/087,320

(22) PCT Filed: Jan. 19, 2007

(86) PCT No.: PCT/EP2007/000451
§ 371 (c)(1),
(2), (4) Date: Jun. 26, 2008

(87) PCT Pub. No.: WO2007/085380
PCT Pub. Date: Aug. 2, 2007

(65) Prior Publication Data
US 2009/0011263 A1      Jan. 8, 2009

(30) Foreign Application Priority Data
Jan. 24, 2006   (EP) ..................................... 06001400

(51) Int. Cl.
*B32B 7/02* (2006.01)
*B32B 27/30* (2006.01)
*B32B 27/32* (2006.01)
*B32B 27/36* (2006.01)
*B32B 37/15* (2006.01)

(52) U.S. Cl. ..... 428/212; 428/35.7; 428/36.6; 428/36.7; 428/343; 428/346; 428/347; 428/349; 428/355 EN; 428/480; 428/483; 428/500; 428/515; 428/516; 428/520; 428/522; 428/523; 428/910; 264/210.1; 264/232; 264/234; 264/235; 264/235.6; 264/235.8; 264/288.4; 264/290.2

(58) Field of Classification Search ........................ None
See application file for complete search history.

(56) References Cited

U.S. PATENT DOCUMENTS

| 3,904,104 | A | * | 9/1975 | Kane | 229/5.84 |
| 4,011,358 | A | * | 3/1977 | Roelofs | 428/516 |
| 4,086,212 | A | * | 4/1978 | Bier et al. | 528/302 |
| 4,375,494 | A | * | 3/1983 | Stokes | 428/323 |
| 4,455,184 | A | * | 6/1984 | Thompson | 156/244.11 |
| 4,590,131 | A | * | 5/1986 | Yazaki et al. | 428/516 |
| 4,675,219 | A | * | 6/1987 | Muneki et al. | 428/36.6 |
| 4,980,210 | A |   | 12/1990 | Heyes | |
| 5,084,352 | A | * | 1/1992 | Percec et al. | 428/412 |

(Continued)

FOREIGN PATENT DOCUMENTS
EP    0 312 308 A    4/1989
(Continued)

*Primary Examiner* — Vivian Chen
(74) *Attorney, Agent, or Firm* — Daniel B. Ruble

(57) ABSTRACT

A multilayer oriented film comprising at least one layer (a) comprising one or more polyesters and/or copolyesters characterized by a % of crystallinity higher than 15, an adjacent layer (b) comprising one or more polyolefin-based adhesive resins, and a layer (c) comprising one or more co-polyesters characterized by a % of crystallinity lower than 15, is positioned between said two layers (a) and (b) in such a way that one of the two principal surfaces of layer (c) is directly adhered to layer (a) and the other is directly adhered to layer (b). The presence of a co-polyester layer (c) of relatively low % crystallinity positioned between (co)polyester layer (a) and adhesive layer (b) remarkably increases the bond between the two layers (a) and (b) and prevents delamination problems in the oriented structure.

20 Claims, 2 Drawing Sheets

U.S. PATENT DOCUMENTS

| | | | | |
|---|---|---|---|---|
| 5,164,248 A | * | 11/1992 | Fleury et al. | 428/220 |
| 5,300,563 A | * | 4/1994 | Kiang et al. | 525/42 |
| 5,308,233 A | * | 5/1994 | Denis et al. | 425/151 |
| 5,324,467 A | | 6/1994 | Anderson, II | 264/173.15 |
| 5,567,533 A | * | 10/1996 | Toney et al. | 428/475.5 |
| 5,759,756 A | * | 6/1998 | Laney et al. | 430/527 |
| 5,851,608 A | * | 12/1998 | Yamada et al. | 428/34.2 |
| 6,030,477 A | * | 2/2000 | Olvey | 156/82 |
| 6,333,094 B1 | * | 12/2001 | Schneider et al. | 428/201 |
| 6,620,474 B1 | * | 9/2003 | Regnier et al. | 428/35.7 |
| 7,029,734 B1 | * | 4/2006 | Wuest et al. | 428/35.3 |
| 7,195,804 B2 | * | 3/2007 | Cosentino et al. | 428/34.2 |
| 7,200,977 B2 | * | 4/2007 | Ramesh et al. | 53/434 |
| 7,201,966 B2 | * | 4/2007 | Lischefski | 428/474.4 |
| 2004/0151929 A1 | * | 8/2004 | Cosentino et al. | 428/479.6 |

FOREIGN PATENT DOCUMENTS

| | | | |
|---|---|---|---|
| JP | 59-143638 | * | 8/1984 |
| JP | 62 047716 B | | 10/1987 |
| JP | 08-281892 | * | 10/1996 |
| JP | 10-006458 | * | 1/1998 |
| JP | 02 964606 B2 | | 10/1999 |
| JP | 2001-270055 | * | 10/2001 |

* cited by examiner

MULTILAYER ORIENTED FILM

The present invention relates to multilayer oriented films for packaging applications which comprise polyesters.

In particular the present invention concerns a multilayer oriented film with at least one layer comprising one or more polyesters and/or copolyesters characterized by a relatively high % of crystallinity and an adjacent polyolefin-based adhesive layer, wherein a layer comprising one or more co-polyesters, characterized by a relatively low % of crystallinity, is between said two layers to increase the bond and prevent delamination.

BACKGROUND OF THE INVENTION

Multi-layer oriented films for packaging applications having a polyester outer layer are widely known in the patent literature. These films generally comprise, in addition to the polyester first outer layer, a second outer layer of a heat-sealable material, such as a polyolefin layer, and preferably also a core gas barrier layer, such as a PVDC, EVOH and/or polyamide layer.

Examples of multi-layer oriented films that have a polyester first outer layer, a core gas-barrier layer of e.g. EVOH and/or polyamide, a polyolefin second outer layer and tie layers to adhere the various layers are described for instance in EP-A-476,836, WO 99/55528, WO 99/44824, WO 99/44823, EP-A-1,190,847, WO 01/98081, and WO 05/011978.

In particular, EP-A-476,836 describes an oriented laminated film with a surface layer of a polyester, an EVOH core layer, an intermediate layer of certain polyamides, with a given thickness ratio between the outer polyester layer and the core polyamide layer, and a heat-sealing layer of polyolefin. Tie layers of an acid modified ethylene-α-olefin copolymer (M-PE) are then used to bind the outer polyester layer to the intermediate polyamide layer.

WO 99/44823 describes EVOH-containing heat-shrinkable films with at least four layers, i.e., a first outer layer possibly comprising a polyester, a second outer layer which may comprise a polyethylene, a core EVOH layer and an additional core polyamide or polyester layer wherein an adhesive layer, such as a layer of modified ethylene-methyl acrylate is used to bind the outer polyester layer to a core layer.

WO 99/55528, EP-A-1,190,847, and WO 01/98081 relate to heat-shrinkable structures where in addition to the polyester and polyolefin outer layers, a core polyamide layer is present and optionally also an EVOH layer and a tie layer of e.g., a modified ethylene-α-olefin copolymer, is used to bind the outer polyester to a core layer.

WO 05/011978 describes high modulus bi-axially oriented films comprising a first outer layer which comprises a polyester, a second outer layer comprising an ethylene or propylene homo- or co-polymer, a core layer comprising EVOH, and no core polyamide or polyester layers. Also in this case the outer polyester layer is generally bound to a core layer by an adhesive layer.

In all these films the use in the outer layer of one or more ring-containing polyesters or co-polyesters characterized by a % of crystallinity relatively high, at least >15, and preferably >20, gives a number of different advantages to the end structures, such as a remarkable abuse resistance, easy printability, very good optical properties, in particular gloss, etc.

Depending on the particular resins employed and of the particular end applications desired, these films can be manufactured by coextrusion, extrusion coating, and/or lamination of preformed cast films, followed by mono- or biaxial orientation, and optionally by an annealing or heat-setting step, or they may be prepared by lamination of preformed films of which at least part have been mono- or bi-axially oriented. In most of these process, but in particular when the films are obtained by coextrusion followed by orientation, adhesive or tie layers, typically polyolefin-based, in particular polyethylene- or propylene-based, are employed to increase the adhesion (also called "bond") between the various layers.

It has been found however that, in case of oriented structures, either heat-shrinkable or heat-set, the bond strength between a polyester or co-polyester layer of relatively high % of crystallinity and such a conventional adhesive layer is sometimes not sufficiently high to avoid possible delamination problems.

It has been found—and this is the gist of the present invention—that it is however possible to increase such a bond by positioning between the layer of polyester or co-polyester of relatively high % of crystallinity and the adjacent polyolefin-based adhesive layer, a layer of a co-polyester characterized by a relatively low % of crystallinity.

SUMMARY OF THE INVENTION

A first object of the present invention is therefore a multilayer oriented film comprising at least one layer (a) comprising one or more polyesters and/or copolyesters characterized by a % of crystallinity, as evaluated by DSC (Differential Scanning Calorimetry), higher than 15, an adjacent layer (b) comprising one or more polyolefin-based adhesive resins, and a layer (c) comprising one or more co-polyesters characterized by a % of crystallinity, as evaluated by DSC, lower than 15, positioned between said two layers (a) and (b) in such a way that one of the two principal surfaces of layer (c) is directly adhered to layer (a) and the other is directly adhered to layer (b).

The presence of a layer (c) comprising a co-polyester characterized by a relatively low % crystallinity will prevent delamination of the overall oriented structure, by remarkably increasing the bond between the layers. This increase in bond can be obtained not only when the layer (a) comprising one or more polyesters and/or co-polyesters characterized by a relatively high % of crystallinity is an outer layer of the overall oriented structure but also when said layer (a) is an inner layer of the oriented structure.

However, in a preferred embodiment of the present invention the layer (a) comprising one or more polyesters and/or co-polyesters characterized by a relatively high % of crystallinity is an outer layer of the overall oriented film and the film may comprise and preferably does comprise additional layers such as a second outer layer (d) comprising a heat-sealable resin, an optional core barrier layer (e), possible bulk layers (f) and additional adhesive layers (g), if needed or desired, to bind the other film layers.

The film is mono- or, preferably, bi-axially oriented.

In one embodiment it is a heat-shrinkable film and has a free shrink at 120° C. of at least 10% in each direction.

In another embodiment it is a non-shrinkable heat-set film with a free shrink at 120° C. which is ≦5%, preferably ≦3%, and even more preferably ≦2% in each direction.

A second object of the present invention is the use of a film according to the first object in packaging applications.

DEFINITIONS

As used herein, the term "film" is used in a generic sense to include plastic web, regardless of whether it is film or sheet.

Typically, films of and used in the present invention have a thickness of 150 μm or less, preferably they have a thickness of 120 μm or less, more preferably a thickness of 100 μm or less, still more preferably a thickness of 75 μm or less, and yet, still more preferably, a thickness of 60 μm or less.

As used herein, the phrase "outer layer" refers to any layer of film having only one of its principal surfaces directly adhered to another layer of the film As used herein, the phrases "inner layer", "intermediate layer", and "internal layer" refer to any layer having both of its principal surfaces directly adhered to another layer of the film.

As used herein, the phrase "inside layer" when referred to a package made using the multi-layer film of the invention refers to the outer layer of the film which is closest to the packaged product, relative to the other layers thereof.

As used herein, the phrase "outside layer" when referred to a package made using the multi-layer film of the invention refers to the outer layer of the film which is furthest from the product relative to the other layers thereof.

As used herein, the term "core", and the phrase "core layer", refers to any internal layer that preferably has a function other than serving as an adhesive or compatibilizer for adhering two layers to one another.

As used herein, the phrases "seal layer", "sealing layer", "heat seal layer", and "sealant layer", refer to an outer layer involved in the sealing of the film to itself, to another layer of the same or another film, and/or to another article which is not a film. With respect to packages having only fin-type seals, as opposed to lap-type seals, the phrase "sealant layer" generally refers to the inside layer of a package.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrases "orientation ratio" and "stretching ratio" refer to the multiplication product of the extent to which the plastic film material is expanded in the two directions perpendicular to one another, i.e. the machine direction and the transverse direction.

As used herein, the phrases "heat-shrinkable," "heat-shrink," and the like, refer to the tendency of the film to shrink upon the application of heat, i.e., to contract upon being heated, such that the size of the film decreases while the film is in an unrestrained state. As used herein said term refer to films with a free shrink in at least one direction, as measured by ASTM D 2732, of at least 10% at 120° C.

As used herein, the term "polymer" refers to the product of a polymerization reaction, and is inclusive of homo-polymers and co-polymers.

As used herein, the term "homo-polymer" is used with reference to a polymer resulting from the polymerization of a single monomer, i.e., a polymer consisting essentially of a single type of mer, i.e., repeating unit.

As used herein, the term "co-polymer" refers to polymers formed by the polymerization reaction of at least two different monomers. The term "co-polymer" is inclusive of ter-polymers, random co- or ter-polymers, block co- or ter-polymers, and graft co- or ter-polymers.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts in heterogeneous catalysis conditions.

As used herein, the phrase "homogeneous polymer" refers to polymerization reaction products of relatively narrow molecular weight distribution and relatively narrow composition distribution. Homogeneous polymers are structurally different from heterogeneous polymers, in that homogeneous polymers exhibit a relatively even sequencing of co-monomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler Natta catalysts.

As used herein, the term "polyolefin" refers to the polymer or co-polymer resulting from the polymerisation or co-polymerisation of unsaturated aliphatic, linear or cyclic, straight or branched, hydrocarbon monomers that may be substituted or unsubstituted. More specifically, included in the term polyolefin are film-forming homo-polymers of olefin, co-polymers of olefin, co-polymers of an olefin and an non-olefinic co-monomer co-polymerizable with the olefin, such as vinyl monomers, and the like. Specific examples include polyethylene homo-polymer, polypropylene homo-polymer, poly-butene homo-polymer, ethylene-α-olefin co-polymer, propylene-α-olefin co-polymer, butene-α-olefin co-polymer, ethylene-unsaturated ester co-polymer, ethylene-unsaturated acid co-polymer, (e.g., ethylene-($C_1$-$C_4$)alkyl acrylate or methacrylate copolymers, such as for instance ethylene-ethyl acrylate co-polymer, ethylene-butyl acrylate co-polymer, ethylene-methyl acrylate co-polymer, ethylene-methyl methacrylate co-polymer, ethylene-acrylic acid co-polymer, and ethylene-methacrylic acid co-polymer), ionomer resin, polymethylpentene, etc.

As used herein, the phrase "ethylene-α-olefin copolymer" is inclusive of both heterogeneous and homogeneous materials with a density usually in the range of from about 0.880 g/cm$^3$ to about 0.945 g/cm$^3$. All these materials generally include co-polymers of ethylene with one or more co-monomers selected from $C_4$ to $C_{10}$ α-olefin such as butene-1, hexene-1, octene-1, etc. in which the molecules of the copolymers comprise long chains with relatively few side chain branches or cross-linked structures.

As used herein the term "modified" is inclusive of polymers prepared by polymerization of the monomers or comonomers thereof with an unsaturated carboxylic acid, e.g., maleic acid, fumaric acid or the like, or a derivative thereof such as the anhydride, ester or metal salt or the like; it is also inclusive of modified polymers obtained by incorporating into the homo-polymer or co-polymer, by blending or preferably by grafting, an unsaturated carboxylic acid, e.g., maleic acid, fumaric acid or the like, or a derivative thereof such as the anhydride, ester or metal salt or the like.

As used herein, the term "adhered", as applied to film layers, broadly refers to the adhesion of a first layer to a second layer either with or without an adhesive, a tie layer or any other layer therebetween; the word "between", as applied to a layer expressed as being between two other specified layers, includes both direct adherence of the subject layer to the two other layers it is between, as well as a lack of direct adherence to either or both of the two other layers the subject layer is between, i.e., one or more additional layers can be imposed between the subject layer and one or more of the layers the subject layer is between. In contrast, as used herein, the phrase "directly adhered" is defined as adhesion of the subject layer to the object layer, without a tie layer, adhesive, or other layer therebetween.

As used herein, "EVOH" refers to ethylene/vinyl alcohol copolymer. EVOH includes saponified or hydrolyzed ethylene/vinyl acetate copolymers with a degree of hydrolysis preferably at least 50%, and more preferably, at least 85%. Preferably, the EVOH comprises from about 28 to about 48 mole % ethylene, more preferably, from about 32 to about 44 mole % ethylene.

As used herein, the term "polyamide" refers to both polyamide homo-polymers and polyamide co-polymers, also called co-polyamides.

As used herein the term "co-polyamide" on the other hand identifies the polyamide product built from at least two different starting materials, i.e. lactams, aminocarboxylic acids, equimolar amounts of diamines and dicarboxylic acids, in any proportion; this term therefore also encompasses ter-polyamides and, in general, multi-polyamides.

As used herein the terms "major proportion" and "minor proportion" when referred to a resin as a component of a layer, refer to an amount respectively higher than 50 wt. % or lower than 50 wt. % of said resin calculated on the overall weight of the layer.

As used herein with the terms "polyolefin layer" or "polyester layer" it is intended to refer to layers comprising a major proportion of polyolefin or polyester components respectively.

DETAILED DESCRIPTION OF THE INVENTION

Figure 1:
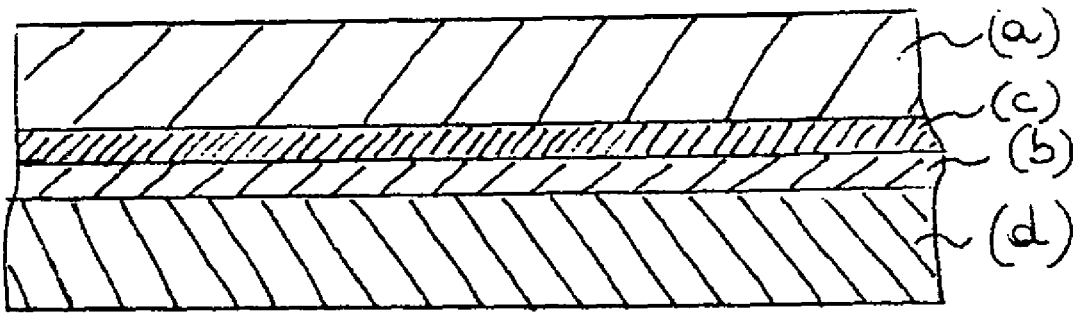
FIG. 1 is a schematic and enlarged view of a section of a film according to a first preferred embodiment of the invention, comprising 4 layers.
Figure 2:
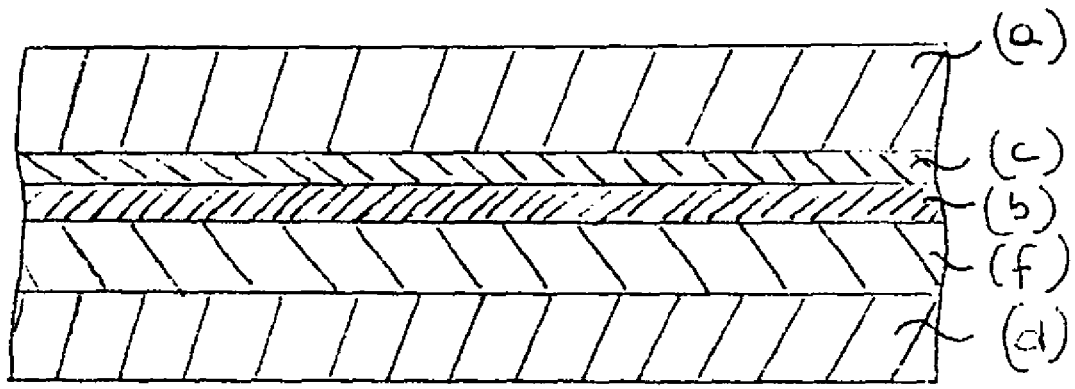
FIG. 2 is a schematic and enlarged view of a section of a film according to a second preferred embodiment of the invention, comprising 5 layers.
Figure 3:
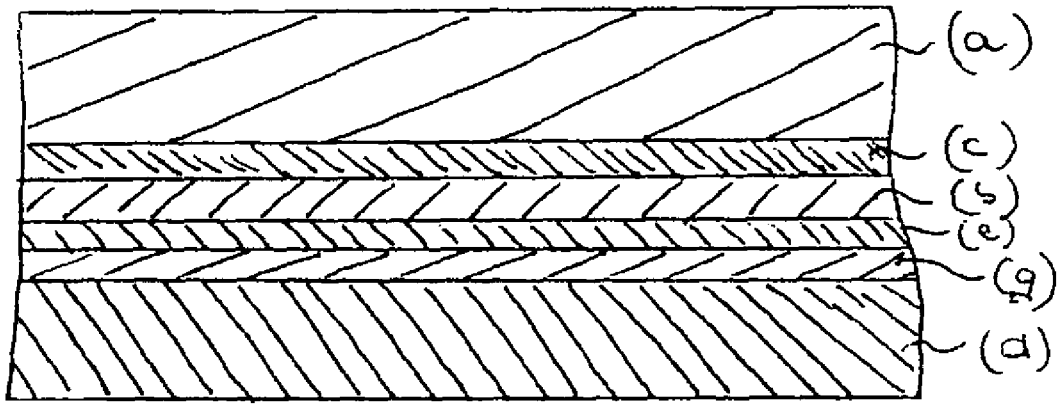
FIG. 3 is a schematic and enlarged view of a section of a film according to a third preferred embodiment of the invention, comprising 6 layers.
Figure 4:
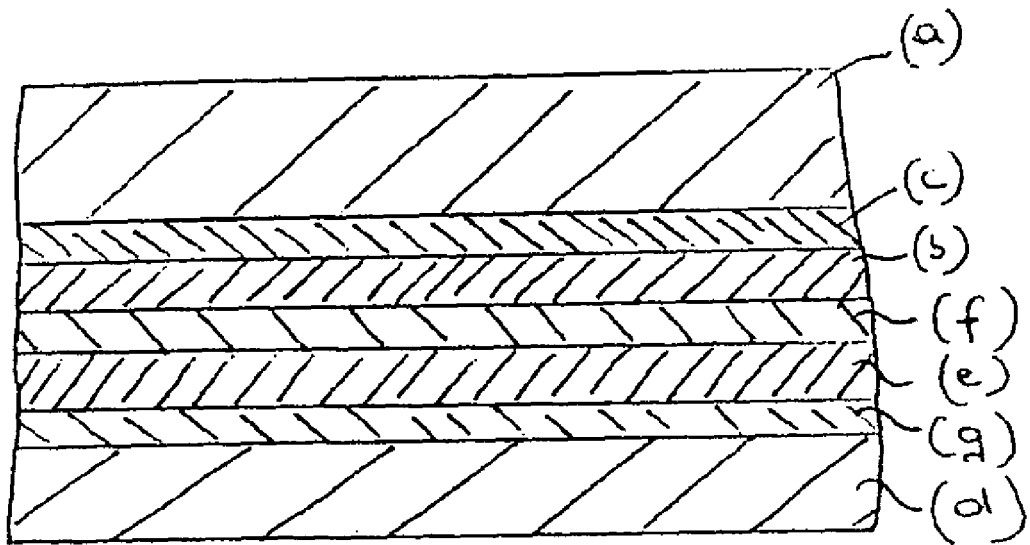
FIG. 4 is a schematic and enlarged view of a section of a film according to a fourth preferred embodiment of the invention, comprising 7 layers.
Figure 5:
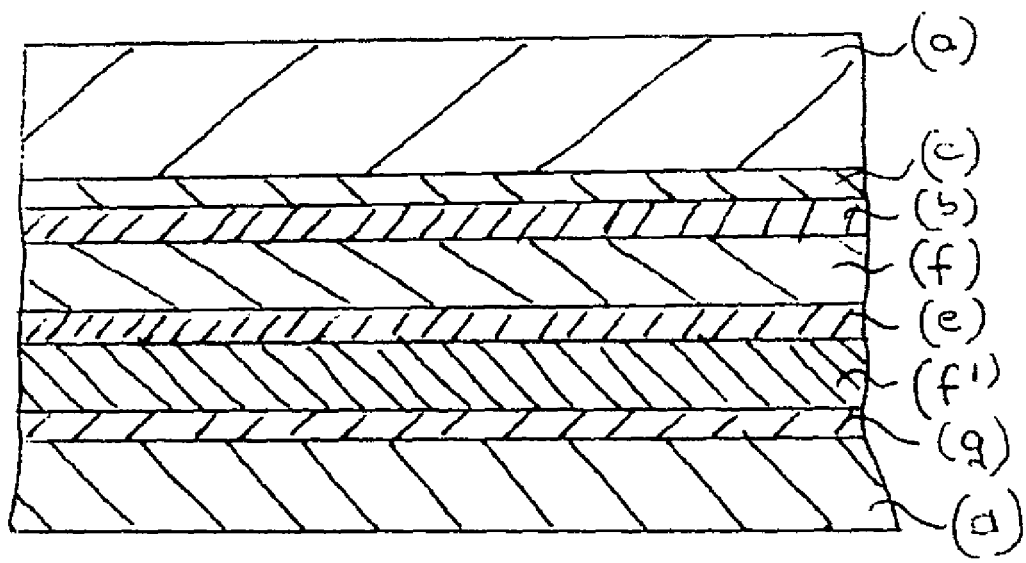
FIG. 5 is a schematic and enlarged view of a section of a film according to a fifth preferred embodiment of the invention, comprising 8 layers.

In the oriented film according to the present invention, preferably the % of crystallinity of the polyesters and/or copolyesters of layer (a) will be higher than 20, more preferably higher than 22 and even more preferably higher than 28.

On the other hand the % of crystallinity of the co-polyesters of layer (c) will preferably be lower than 12, more preferably lower than 10, and even more preferably lower than 8. Most preferred copolyesters for layer (c) will be substantially amorphous.

The % of crystallinity of the polyesters and co-polyesters suitable for layers (a) and (c), is evaluated by Differential Scanning Calorimetry (DSC), as known in the art (see for instance the chapter on DSC of the Polymer Sciences Learning Center edited by the Department of Polymer Sciences of the University of Southern Mississippi and available on internet at the address http://www.pslc.ws/mactest/dsc.htm). Polyester homo and co-polymers that can be used for layer (a) are typically film-forming, ring-containing, homo-and co-polyesters.

Polyesters are polymers containing ester groups in their backbone chain obtained from the reaction of a diol with a diacid. In homopolyesters only one species of diol and of diacid are employed, while in co-polyesters at least one of the carboxylic acids or of the diols is used in combination of at least two species.

Suitable polyesters for layer (a) include homo-polyesters, such as poly(ethylene terephthalate), poly(ethylene 2,6-naphthalate), poly(1,2-propylene terephthalate), poly(ethylene 2,5-dimethyl-terephthalate), poly(butylene terephthalate), poly(ethylene isophthalate), poly(ethylene 5-t-butyl-isophthalate), poly(butylene 2,6-naphthalate), and the like homopolymers, and co-polyesters where the diacid component is still mainly based on aromatic diacids such as terephthalic acid, isophthalic acid, alkyl substituted-terephtahlic acid, alkyl-substituted isophthalic acid, naphthalenic acid, and the like diacids, and where the second diol or diacid component is typically present in a molar proportion, over the total molar amount of diol or diacid component in the co-polyester, which is less than 5%, and preferably less than 3%.

Suitable homo-polyester and co-polyester resins for layer (a) are typically characterized by a high Tm, such as a Tm higher than 220° C., and generally higher than 230° C. They are also typically characterized by a Vicat softening temperature which is higher than 110° C., and generally higher than 120° C. The Vicat softening point is evaluated by ASTM D1525.

Preferably, layer (a) will contain more than 70%, more preferably more than 80% and even more preferably more than 90%, calculated on the basis of the overall weight of the layer, of polyester and/or copolyester resins with a % crystallinity >15. In a most preferred embodiment said layer (a) will consist of one or more suitable homo- and/or co-polyesters optionally blended with up to about 10% of a masterbatch containing conventional additives, as known in the art, dispersed in a (co)polyester matrix. Suitable additives for layer (a) are for instance nucleating agents (see for instance Table 1 of the Literature Review by H. Zhou available at the internet address www.crd.ge.com as 98CRD138). A class of particularly preferred nucleating agents are the inorganic compounds such as talc, silicate, clay, titanium dioxide, and the like. These compounds can be used in an amount of less than 5% by weight, typically in an amount of 1-2% by weight on the total weight of the layer. Other preferred nucleating agents are certain compatible polymers such as fluoropolymers (PTFE) and the faster crystallizing polymers that can be blended with the polyester of said layer (a) in an amount of up to e.g. 5-8% by weight.

Adhesive layer (b) will comprise one or more modified polyolefins, optionally blended with one or more polyolefins.

The adhesive layer (b) generally will comprise one or more ethylene- or propylene-homo- or co-polymers containing polar groups that may be part of the polymer backbone or be grafted thereon. Typical polymers that are employed for layer (b) thus include ethylene-unsaturated acid copolymers, ethylene-unsaturated ester copolymers, modified polyethylene, modified ethylene-α-olefin copolymers, modified ethylene-vinyl acetate copolymers, modified ethylene-alkyl (meth) acrylate copolymers, modified ethylene-(meth)acrylic acid copolymers, modified ethylene-propylene copolymer, modified ethylene-propylene-α-olefin co-polymers, and mixtures thereof.

Preferably layer (b) will comprise one or more polymers selected from anhydride or carboxylic acid modified polyethylene, anhydride modified ethylene-α-olefin copolymers, ethylene-vinyl acetate copolymers, anhydride modified ethylene-vinyl acetate copolymers, ethylene-methyl acrylate copolymers, anhydride modified ethylene-methyl acrylate copolymers, ethylene-butyl acrylate copolymers, anhydride modified ethylene-butyl acrylate copolymers, ethylene-acrylic acid copolymers, anhydride modified ethylene-acrylic acid copolymers, anhydride modified ethylene-propylene copolymer, anhydride modified ethylene-propylene-α-olefin co-polymers, and the like.

More preferably layer (b) will comprise one or more polymers selected from anhydride or carboxylic acid modified polyethylene, anhydride modified heterogeneous ethylene-α-olefin copolymers, ethylene-vinyl acetate copolymers, anhydride modified ethylene-vinyl acetate copolymers, ethylene-methyl acrylate copolymers, anhydride modified ethylene-methyl acrylate copolymers, ethylene-butyl acrylate copolymers, anhydride modified ethylene-butyl acrylate copolymers, ethylene-acrylic acid copolymers, anhydride modified ethylene-acrylic acid copolymers, anhydride modified ethylene-propylene copolymer, and anhydride modified ethylene-propylene-α-olefin co-polymers.

Co-polyesters suitable for layer (c) are ring-containing copolyesters, and in particular random copolyesters, i.e. those copolymers where the various components are randomly incorporated into the copolyester chain, alternating or patterned copolyesters, i.e. those copolyesters whose constituent units stand in a regular pattern of succession along the molecular chains, or block or segmented copolyesters. Examples of dicarboxylic acids that can be included in the copolyester resins suitable for layer (c) are terephthalic acid, isophthalic acid, 2,5-dimethyl-terephthalic acid, 5-t-butyl-isophthalic acid, naphthalene dicarboxylic acid, cyclohexane-dicarboxylic acid, diphenyl ether dicarboxylic acid, sebacic acid, adipic acid, azelaic acid, and the like acids. Examples of diols are ethylene glycol, 1,2-propane-diol, 1,3-propane-diol, 1,4-butanediol, 1,6-hexane-diol, 1,4-cyclohexane-dimethanol , 2,2-bis(4-hydroxyphenyl)propane, and the like.

According to a preferred embodiment co-polyesters for layer (c) are selected among the glycolised co-polyesters, i.e., copolymers where there is a single carboxylic acid and more than one diol. Particularly preferred among the glycolised copolyesters are PETG, i.e., esters co-polymers where the carboxylic acid component is terephthalic acid and in addition to the ethylene glycol other glycols are incorporated as the diol component, such as 1,4-cyclohexane-dimethanol, 1,4-butanediol, etc. Generally the molar proportion of the second diol in the PETG products is higher than 5%.

Copolyester resins suitable for layer (c) are typically characterized by either no detectable Tm or by a Tm lower 200° C., generally lower than 190° C. Also, they are typically characterized by a Vicat softening point lower than 110° C., generally lower than 100° C.

The Tg's of the film forming polyesters used for layers (a) and (c) is preferably below 130° C., in order to allow orientation of the extruded structure at conventional temperatures. Preferably said Tg's will be below 110° C., more preferably below 100° C., and even more preferably below 90° C.

Layer (c) will contain a major proportion of one or more co-polyesters. Preferably it will comprise more than 70%, more preferably more than 80% and even more preferably more than 90%, calculated on the basis of the overall weight of the layer, of one or more co-polyesters characterized by a % crystallinity <15.

It has been found that a thickness of 1-2 μm for layer (c) is sufficient to remarkably improve the bond between the (co)polyester layer (a) and the adhesive layer (b). Typically layer (c) will thus have a thickness of from about 1 to about 10 μm, and preferably from about 2 to about 8 μm. Layer (c) may also be thicker but this will not further increase the bond between the (co)polyester layer (a) and the adhesive layer (b).

According to a preferred embodiment of the present invention the (co)polyester layer (a) is a first outer layer of the overall film and the film also comprises a second outer heat sealable layer (d).

A further specific object of the present invention is therefore an oriented multi-layer film comprising at least a first outer layer (a) comprising one or more polyesters and/or copolyesters characterized by a % of crystallinity higher than 15, an adjacent inner adhesive layer (b) comprising one or more ethylene- or propylene-based polymers containing polar groups, wherein a layer (c) comprising one or more co-polyesters characterized by a % of crystallinity lower than 15, is positioned between said two layers (a) and (b) in such a way that one of the two principal surfaces of layer (c) is directly adhered to layer (a) and the other is directly adhered to layer (b), and a second outer layer (d) of a heat-sealable polyolefin.

The thickness of the (co)polyester outer layer (a) will be typically up to about 45% of the thickness of the overall structure, preferably up to about 40%, more preferably up to about 35% of the overall thickness. Preferably the thickness of said first outer layer (a) will be comprised between about 8 and about 40%, and more preferably between about 10 and about 35%, of the overall film thickness.

The heat-sealable second outer layer (d) will preferably comprise polymers selected from ethylene homo-polymers, ethylene co-polymers, propylene homo-polymers and propylene co-polymers.

Ethylene homo- and co-polymers suitable for the heat-sealable second outer layer (d) are selected from the group consisting of ethylene homo-polymers (polyethylene), heterogeneous or homogeneous ethylene-α-olefin copolymers, ethylene-vinyl acetate co-polymers, ethylene-($C_1$-$C_4$) alkyl acrylate or methacrylate co-polymers, such as ethylene-ethyl acrylate co-polymers, ethylene-butyl acrylate co-polymers, ethylene-methyl acrylate co-polymers, and ethylene-methyl methacrylate co-polymers, ethylene-acrylic acid co-polymers, ethylene-methacrylic acid co-polymers, and blends thereof in any proportion.

Preferred ethylene homo- and co-polymers for said second outer layer are e.g. polyethylene having a density of from about 0.900 g/cm$^3$ to about 0.950 g/cm$^3$, heterogeneous and homogeneous ethylene-α-olefin copolymers having a density of from about 0.880 g/cm$^3$ to about 0.945 g/cm$^3$, more preferably of from about 0.885 g/cm$^3$ to about 0.940 g/cm$^3$, yet more preferably of from about 0.890 g/cm$^3$ to about 0.935 g/cm$^3$, and ethylene-vinyl acetate copolymers comprising from about 3 to about 28%, preferably, from about 4 to about 20%, more preferably, from about 4.5 to about 18 vinyl acetate comonomer, and blends thereof.

Even more preferred ethylene homo- and co-polymers for said second outer layer are selected from the group consisting of heterogeneous ethylene-α-olefin copolymers having a density of from about 0.890 g/cm$^3$ to about 0.940 g/cm$^3$, homogeneous ethylene-α-olefin copolymers having a density of from about 0.890 g/cm$^3$ to about 0.925 g/cm$^3$, ethylene-vinyl acetate copolymers comprising from about 4.5 to about 18% vinyl acetate comonomer, and blends thereof.

In one embodiment of this specific aspect, said second outer layer (d) comprises a blend of at least two different ethylene-α-olefin copolymers with a density of from about 0.890 g/cm$^3$ to about 0.935 g/cm$^3$, more preferably a blend of a homogeneous and a heterogeneous ethylene-α-olefin copolymer, optionally blended with ethylene-vinyl acetate copolymer.

Preferably, the ethylene homo- or co-polymers for said second outer layer (d) have a melt index of from about 0.3 to about 10 g/10 min, more preferably from about 0.5 to about 8 g/10 min, still more preferably from about 0.8 to about 7 g/10 min, even more preferably from about 1 to about 6 g/10 min (as measured by ASTM D1238—190° C., 2.16 kg).

Propylene homo- and co-polymers suitable for the said second outer layer (d) are selected from the group consisting of propylene homo-polymers (polypropylene), crystalline or highly amorphous (i.e., a polypropylene with a crystalline fraction of not more than about 10 wt. %), and propylene copolymers with up to 50 wt. %, preferably up to 35 wt. %, of ethylene and/or a ($C_4$-$C_{10}$)-α-olefin, and blends thereof in any proportion.

Preferred propylene homo- and co-polymers for said second outer layer (d) are e.g. polypropylene, and propylene copolymers with up to 35 wt. %, of ethylene and/or butene-1, pentene-1, or hexene-1, and blends thereof in any proportion.

Even more preferred propylene homo- and co-polymers for said second outer layer (d) are selected from the group consisting of highly amorphous polypropylene, propylene-ethylene copolymers with an ethylene content lower than about 25 wt. %, more preferably lower than about 15 wt. % and even more preferably lower than about 12 wt. %, propylene-ethylene-butene co-polymers and propylene-butene-ethylene copolymers with a total ethylene and butene content lower than about 40 wt. %, preferably lower than about 30 wt. %, and even more preferably lower than about 20 wt. %.

Preferably, the propylene homo- or co-polymers for said second outer layer (d) have a melt index of from about 0.5 to about 20 g/10 min, more preferably from about 0.8 to about 12 g/10 min, still more preferably from about 1 to about 10 g/10 min (as measured by ASTM D1238—230° C., 2.16 kg).

Said second outer layer (d) may also contain a blend of one or more ethylene homo-and/or co-polymers with one or more propylene homo- and/or co-polymers, in any proportion. It may also comprise a blend of a major proportion of one or more polymers of the group of ethylene homo- and copolymers and propylene homo- and copolymers, with a minor proportion of one or more other polyolefins or modified polyolefins, such as polybutene homo-polymers, butene-($C_5$-$C_{10}$)-α-olefin copolymers, ionomers, anhydride grafted ethylene-α-olefin copolymers, anhydride grafted ethylene-vinyl acetate copolymers, anhydride grafted propylene homopolymer, rubber modified ethylene-vinyl acetate copolymers, and the like.

Said additional polymers may be blended with the basic polymers of said second outer layer (d) in an amount that is typically up to about 40% by weight, preferably up to about 30% by weight, more preferably up to about 20% by weight, and still more preferably up to about 10% by weight.

In a preferred embodiment however said second outer layer (d) will essentially consist of one or more polymers selected from the group of ethylene homo- and co-polymers, and propylene homo- and co-polymers.

The thickness of said second outer layer (d) is generally higher than about 10% of the overall thickness of the structure, preferably higher than about 15% and even more preferably higher than about 20%, being typically comprised between about 20 and about 60%, preferably between about 25 and about 50% of the overall thickness of the film.

In a further preferred embodiment the film according to the present invention also contains a core layer (e), which acts as a gas-barrier layer, comprising a gas barrier polymer.

A still further specific object of the present invention is therefore an oriented multi-layer film comprising at least a first outer layer (a) comprising one or more polyesters and/or copolyesters characterized by a % of crystallinity higher than 15, an adjacent inner adhesive layer (b) comprising one or more ethylene- or propylene-based polymers containing polar groups, wherein a layer (c) comprising one or more co-polyesters characterized by a % of crystallinity lower than 15, is positioned between said two layers (a) and (b) in such a way that one of the two principal surfaces of layer (c) is directly adhered to layer (a) and the other is directly adhered to layer (b), a second outer heat-sealable polyolefin layer (d), and a core gas-barrier layer (e).

Examples of gas-barrier polymers that can suitably be employed for the gas-barrier layer (e) are EVOH, PVDC, polyamides, and blends of EVOH with polyamides. Preferably however the gas-barrier layer (e) will comprise EVOH and/or polyamides and more preferably said barrier layer will comprise EVOH optionally blended with a minor amount of one or more polyamide components.

In particular said core layer will comprise at least 70%, still more preferably at least 80%, and yet still more preferably at least 90% by weight of a single EVOH or a blend of two or more EVOHs. Examples of EVOH that may well be employed in the production of films according to the present invention are EVAL™ EC F151A or EVAL™ EC F101A, marketed by Marubeni. The possible complement to 100% in said core gas-barrier layer is typically made of one or more polyamides, either aliphatic or aromatic, such as those commonly indicated as nylon 6, nylon 66, nylon 6/66, nylon 12, nylon 6,12, nylon 6I/6T, nylon MXD6/MXDI, and the like. In such a case a preferred polyamide is nylon 6/12, a copolymer of caprolactam with laurolactam, such as GRILON™ CF 6S or GRILON™ W8361 manufactured by EMS, MXD6/MXDI a copolyamide with units from meta-xylylendiamine, adipic acid and isophthalic acid, such as GRILON™ FE458 manufactured by EMS or a multipolyamide with monomers from hexamethylenediamine, meta-xylylenediamine, adipic acid and sebacic acid, such as GRILON™ XE3569 manufactured by EMS. Other plasticisers and/or other resins compatible with EVOH, as known in the art, can however be present in addition to or alternatively to the polyamide.

Alternatively the possible complement to 100% in said core gas barrier layer can be made of one or more low molecular weight plasticisers, such as for instance the low molecular weight diols or triols, e.g., 1,2-propanediol, butanediol, propanetriol or pentanediol which are known to increase the stretchability of the EVOH resins.

Still alternatively the possible complement to 100% can be made by blends of polyamides with low molecular weight plasticisers.

The thickness of said barrier layer will depend on the barrier properties desired for the end film. More particularly its thickness will be set in order to provide the overall multi-layer film with the desired Oxygen Transmission Rate (OTR) (evaluated by following the method described in ASTM D-3985 and using an OX-TRAN instrument by Mocon). For high gas barrier films an OTR lower than 50, preferably lower than 10, and even more preferably lower than 5 $cm^3$/$m^2$.d.atm, when measured at 23° C. and 0% of relative humidity is generally required. Typically, when EVOH is employed as the gas-barrier material, optionally blended with up to 20% by weight of a polyamide, this is achieved with barrier layers 2 to 6 μm thick. Thicker or thinner EVOH containing layers may however be employed depending on the barrier properties required and on the particular composition of said EVOH containing layer.

The film may contain additional core layers, such as "bulk" layers or "structural" layers (f), i.e. layers that may be used to improve the abuse or puncture resistance of the film or just to provide the desired thickness, "shrink" layers, i.e. layers that may be added to improve the shrink properties of the end film, when a heat-shrinkable film is desired, and/or "seal-assist" layers, i.e., inner layers that are directly adhered to the second outer layer (d) and favour the heat-sealability of the film (as described for instance in U.S. Pat. No. 6,682,825 or in U.S. Pat. No. 6,063,462), which are polyolefin layers. Polymers suitable for any of these layers are in particular ethylene homo- and co-polymers, e.g. low density polyethylene, ethylene-vinyl acetate copolymers, linear low density polyethylenes and linear very low density polyethylenes. The thickness of these additional layers, if any, will depend mainly on the overall thickness desired for the film.

Additional tie layers (g) which may be equal to or different from adhesive layer (b) may be used when one or more core layers are present, to better adhere said layers to the adjacent ones. The thickness of the tie layers (g) as well as the thickness of the adhesive layer (b) is generally kept as low as possible in view of the high cost of these resins. Typically it will be from about 1, preferably about 2, to about 10, preferably about 8 μm. While layers thinner than 1 μm are generally not sufficient to provide the desired adherence, tie layers thicker than 10 μm may well be employed but without providing a further increase in the bond properties.

In one preferred embodiment of the present invention the film has four layers with a first outer layer (a) comprising one or more polyesters and/or copolyesters characterized by a % of crystallinity higher than 15, a second outer layer (d) comprising one or more heat-sealable polyolefins, an adhesive layer (b) between the second outer layer (d) and the first outer layer (a), and a layer (c) comprising one or more co-polyesters characterized by a % of crystallinity lower than 15, positioned between said two layers (a) and (b) in such a way that one of the two principal surfaces of layer (c) is directly adhered to layer (a) and the other is directly adhered to layer (b).

In another preferred embodiment of the present invention the film has five layers with a first outer layer (a) comprising one or more polyesters and/or copolyesters characterized by a % of crystallinity higher than 15, a second outer layer (d) comprising one or more heat-sealable polyolefins, a core bulk layer (f), such as a seal-assist layer, directly adhered to the second outer layer (d), an adhesive layer (b) between the core bulk layer (f) and the first outer layer (a), and a layer (c) comprising one or more co-polyesters characterized by a % of crystallinity lower than 15 positioned between said two layers (a) and (b) in such a way that one of the two principal surfaces of said layer (c) is directly adhered to layer (a) and the other one is directly adhered to said adhesive layer (b).

In still another preferred embodiment of the present invention the film has six layers, with a first outer layer (a) comprising one or more polyesters and/or copolyesters characterized by a % of crystallinity higher than 15, a second outer layer (d) comprising one or more heat-sealable polyolefins, an EVOH-containing core layer (e), an adhesive layer (b) between said core gas-barrier layer (e) and the first outer layer (a), a layer (c) comprising one or more co-polyesters characterized by a % of crystallinity lower than 15 positioned between said two layers (a) and (b) in such a way that one of the two principal surfaces of said layer (c) is directly adhered to layer (a) and the other one is directly adhered to said adhesive layer (b), and a tie layer (g) between the core gas-barrier layer (e) and the second outer layer (d).

In still another preferred embodiment of the present invention the film has seven layers, with a first outer layer (a) comprising one or more polyesters and/or copolyesters characterized by a % of crystallinity higher than 15, a second outer layer (d) comprising one or more heat-sealable polyolefins, an EVOH-containing core layer (e), a core polyamide layer (f) between the core gas-barrier layer (e) and the first outer layer (a), directly adhered to the gas-barrier layer (e), an adhesive layer (b) between said polyamide layer (f) and the first outer layer (a), a layer (c) comprising one or more co-polyesters characterized by a % of crystallinity lower than 15 positioned between said two layers (a) and (b) in such a way that one of the two principal surfaces of said layer (c) is directly adhered to layer (a) and the other one is directly adhered to said adhesive layer (b), and a tie layer (g) between the core gas-barrier layer (e) and the second outer layer (d).

In still another preferred embodiment the film has eight layers with a first outer layer (a) comprising one or more polyesters and/or copolyesters characterized by a % of crystallinity higher than 15, a second outer layer (d) comprising one or more heat-sealable polyolefins, an EVOH-containing core layer (e), two polyamide layers (f and f'), one directly adhered to each side of the core gas-barrier layer (e), an adhesive layer (b) between the first outer layer (a) and one of the polyamide layers (f), a tie layer (g) between the other polyamide layer (f') and the second outer layer (d) and a layer (c) comprising one or more co-polyesters characterized by a % of crystallinity lower than 15, positioned between layers (a) and (b) in such a way that one of the two principal surfaces of said layer (c) is directly adhered to polyester layer (a) and the other one is directly adhered to said adhesive layer (b).

In all the film layers, not only in the outer layers (a) and (d), the polymer components may contain appropriate amounts of additives normally included in such compositions. These include slip and anti-block agents such as talc, waxes, silica, and the like, antioxidants, fillers, pigments and dyes, cross-linking inhibitors, cross-linking enhancers, UV absorbers, antistatic agents, anti-fog agents or compositions, and the like additives known to those skilled in the art of packaging films.

Preferably, the film of the present invention has an overall thickness of from about 10 to about 80 μm, more preferably, from about 12 to about 70 μm, and, still more preferably, from about 14 to about 60 μm.

The film according to the present invention is preferably obtained via coextrusion followed by orientation and possibly annealing or heat-setting. While extrusion through a round die and orientation via trapped bubble is possible, preferably the film of the present invention is obtained by melt extruding the polymers or polymer blends used for each layer through a flat die, cooling quickly the multi-layer sheet exiting from the extrusion die by means of a chill roll, optionally irradiating the cast sheet thus obtained to get cross-linking, reheating this flat tape to the suitably selected orientation temperature, and stretching, preferably bi-axially, the heated tape at a stretching ratio of at least 2:1 in each direction, by a tenter apparatus, optionally stabilizing the obtained oriented film by an annealing or an heat-setting step and finally cooling the thus obtained oriented, multi-layer film.

The preferred process for the manufacture of the films according to the present invention involves feeding the extruders with the solid polymer or polymer blend beads for the various layers, melting the polymer beads in the extruders and then forward the molten resins of the layers into a flat extrusion die where they are combined to give the desired sequence. The obtained tape, that is preferably from about 0.1 mm to about 2 mm thick, is then cooled, either by means of a chill roll, typically with the aid of an air knife or an electrostatic pinning system to keep the sheet in contact with the chill roll, or by using a liquid-knife as described in WO-A-95/26867 where a continuous and substantially uniform layer of water or of any other cooling liquid flows onto the surface of the sheet that does not contact the chill roll. Any other known means for cooling the cast web can however be employed.

The cooled sheet is then optionally fed through an irradiation unit, typically comprising an irradiation vault surrounded by a shielding. The flat sheet may in fact be irradiated with high energy electrons (i.e., ionizing radiation) from an iron core transformer accelerator. Irradiation is carried out to induce cross-linking. The flat sheet is preferably guided through the irradiation vault on rolls. It is thus possible by suitably combining the number of rolls and the path of the traveling web within the irradiation unit to get more than one exposure of the sheet to the ionizing radiation. In one embodiment, the sheet is irradiated to a level of from about 10 to about 200 kGy, preferably of from about 15 to about 150 kGy, and more preferably of from about 20 to about 120 kGy, wherein the most preferred amount of radiation is dependent upon the polymers employed and the film end use. While irradiation is preferably carried out on the extruded cast sheet just before orientation, as described above, it could also be carried out, alternatively or additionally, during or after orientation.

The optionally irradiated tape is then fed to the pre-heating zone of a simultaneous tenter apparatus, with or without a prior passage through an IR heated oven. The temperature of the oven in said pre-heating zone, the length thereof and the time spent by the traveling web in said zone (i.e. the web speed) can suitably be varied in order to bring the sheet up to the desired temperature for bi-axial orientation. In a preferred embodiment the orientation temperature is comprised between about 90° C. and about 140° C. and the temperature of the pre-heating zone is kept between about 90° C. and about 150° C. In said pre-heating zone the sheet is clipped but it is not yet stretched. Thereafter, the resulting hot, optionally irradiated, and clipped sheet is directed to the stretching zone of the simultaneous tenter. Any simultaneous stretching means can be used in said zone. Preferably however the clips are propelled throughout the opposed loops of the tenter frame by means of a linear synchronous motor. A suitable line for simultaneous stretching with linear motor technology has been designed by Brückner GmbH and advertised as LISM® line. An alternative line for simultaneous stretching of the extruded flat tape is the MESIM® line, based on a pantograph, equipped with two separated monorails on each side of the orientation unit. The configuration of the tenter can be varied depending on the stretching ratios desired. The stretching ratios that are applied in said process are generally comprised between about 2.5:1 and about 5:1 for MD stretching and between about 2.5:1 and about 5:1 for TD stretching. Preferably however stretching ratios higher than 2.5:1 in both directions are applied, wherein stretching ratios higher than 3:1 in both directions are more preferred. The temperature in the stretching zone is kept close to the selected orientation temperature. The stretched film is then transferred in a zone that, depending on whether a heat-shrinkable or non-shrinkable film is desired, may be a relaxation/annealing or heat-setting zone, heated to a temperature of about 70-120° C., or 130-170° C. respectively. Following said annealing or heat-setting step the film is transferred to a cooling zone where generally air, either cooled or kept at the ambient temperature, is employed to cool down the film. The temperature of said cooling zone is therefore typically comprised between about 20 and about 40° C. At the end of the line, the edges of the film, that were grasped by the clips and have not been oriented, are trimmed off and the obtained bi-axially oriented, heat-shrinkable or heat-set film is then wound up, with or without prior slitting of the film web to the suitable width.

The bi-axially oriented film of the present invention, when heat-shrinkable, may have a total free shrink (shrink in MD+shrink in TD), at 120° C., of from about 20 to about 140 percent, preferably from about 30 to about 130 percent, more preferably from about 40 to about 120 percent, still more preferably from about 50 to about 110 percent, and still more preferably from about 60 to about 100 percent.

The biaxially oriented film of the present invention, when heat-set, will have a total free shrink, at 120° C., lower than 15 percent, preferably lower than 10 percent, more preferably lower than 8, and even more preferably lower than 6%.

The obtained film may then be subjected to a corona discharge treatment to improve the print receptivity characteristics of the film surface. The obtained film may also be coated or sprayed with e.g. an antifog composition, with or without a binder to incorporate the antifog additive into the film; a liquid smoke; an aroma transfer composition; an antibacterial or anti-mould composition; etc. as known in the field.

The invention is further illustrated by the following examples, which are provided for the purpose of representation, and are not to be construed as limiting the scope of the invention.

EXAMPLE 1

A six-layer, 35 μm thick, heat-shrinkable film with the following layer arrangement (d)/(g)/(e)/(b)/(c)/(a)

where the resins used for the different layers and the thickness of each layer are reported below, has been produced by coextrusion through a flat die and then oriented on a simultaneous tenterframe line at the following orientation ratios: MD 3.5:1 and TD 3.8:1.

(a) crystallizable poly(ethylene terephthalate) copolymer (PET9921W commercially available from Voridian) with a % of crystallinity, evaluated by DSC of 28, Tm 240° C., and Vicat softening point of 140° C., containing 5 wt. % of a masterbatch PET-based containing slip and antiblock agents (11.5 μm);

(b) homogeneous ethylene-α-olefin copolymer with d=0.905 g/cm$^3$ and MFI=1.3 g/10', modified with maleic anhydride (ADMER™ AT2146E by Mitsui) (3 μm);

(c) PETG with a % of crystallinity, evaluated by DSC, of less than 5, no detectable Tm, and Vicat softening point of <90° C. (Eastar 6763 by Eastman) (2 μm);

(d) homogeneous ethylene-octene copolymer with a density of 0.902 g/cm$^3$ and a melt index of 1.0 g/10 min (Affinity™ PL1845G by Dow) containing 10 wt. % of a masterbatch based on ethylene-vinyl acetate copolymer (3.5% of vinyl acetate content) containing slip (3 wt. %) and anti-block (0.9 wt. %) agents) (13 μm);

(e) ethylene-vinyl alcohol copolymer (EVOH) (Soarnol A4412 by Nippon Gohsei) (2.5 μm);

(g) homogeneous ethylene-α-olefin copolymer with d=0.905 g/cm$^3$ and MFI=1.3 g/10', modified with maleic anhydride (ADMER™ AT2146E by Mitsui) (3 μm).

The following orientation temperatures were used in the manufacture of the film: 105° C. (pre-heating), 95° C. (stretching) and 100° C. (annealing). The obtained film had a free shrink at 120° C. of 20% (LS) and 20% (TS). The bond, i.e. the load necessary to separate two layers of a structure in a partially delaminated sample, 25 mm wide and 100 mm long, was measured by means of an Instron tensile tester according to ASTM F904. While layers (a) and (c) could not be delaminated, the bond strength between layers (b) and (c) was 500 g/in.

EXAMPLE 2

The same structure obtained above was heat-set by carrying out the annealing step at 190° C. instead of 100° C. The film did not show any shrink behaviour at 120° C. The bond strength tested between layers (b) and (c) was as in Example 1 and also in this case layer (c) could not be delaminated from layer (a).

COMPARATIVE EXAMPLE 3

A film differing from that of Example 1 in the absence of layer (c) has been prepared by following the procedure described in Example 1. The bond strength between layers (a) and (b), tested by the same method described in Example 1, was 200 g/in.

COMPARATIVE EXAMPLE 4

A film differing from that of Example 2 in the absence of layer (c) has been prepared by following the procedure described in Example 2. The bond strength between layers (a) and (b), tested by the same method described in Example 1, showed to be 200 g/in.

Several other resins were used in a five-layer structure according to Comparative Example 4 as tie layers (b): a maleic anhydride modified EVA copolymer (Orevac® 18211 by Arkema), a terpolymer ethylene-vinyl acetate-maleic anhydride (Orevac® 9318 by Arkema), and a maleic anhydride grafted polyethylene (Admer® NF911E by Mitsui Chemicals), but in none of these cases a bond strength higher than 200 g/in was obtained.

The films obtained according to the present invention can be used in the packaging of food and non food products as known in the art. To this purpose they can be used as such in the form of a film or laminate and either wrapped up around the product or employed as a lid for any suitable container such as a tray, or they may be first converted into flexible containers, such as bags or pouches, by conventional techniques well known to the person skilled in the art. They can also be coupled or laminated to other films or sheets to obtain a packaging material of improved performance. The use of structures with a higher bond strength, devoid of any delamination problems, does improve the hermeticity level of the package obtained with the film. In particular the hermeticity level measured substantially in accordance with ASTM 3078-84 by means of a Dopak instrument of a package obtained by using the film of Example 2 and sealing it to itself in a HFFS process, was 0.7-0.8 bar, while the hermeticity level measured with the same type of package obtained with the film of Comparative Example 4, was 0.4-0.5 bar.

In a most preferred embodiment the biaxially oriented non heat-shrinkable films of the present invention can conveniently be employed in all those processes that actually use sheets of biaxially oriented polyester (BO-PET) or biaxially oriented polyamide (BO-PA) glue-laminated to a heat-sealable optionally barrier film. While the performance of the films of the present invention in these packaging processes is at least comparable to that obtained with the conventional laminates because of the remarkable stiffness of the films of the present invention, the process for the manufacture thereof is much easier and much more convenient as any lamination step may be avoided, as well as the use of any glue and solvent involved therein and at the same time the absence of any delamination problem ensures the required or desired level of hermeticity.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

The invention claimed is:
1. A multilayer oriented film comprising:
at least one layer (a) comprising one or more homo-polyesters and/or copolyesters characterized by a % of crystallinity higher than 15,
layer (b) comprising one or more polyolefin-based adhesive resins selected from one or more of ethylene-unsaturated acid copolymers, ethylene-unsaturated ester copolymers, modified polyethylene homopolymer, modified ethylene-α-olefin copolymers, modified ethylene-vinyl acetate copolymers, modified ethylene-alkyl (meth)acrylate copolymers, modified ethylene-(meth) acrylic acid copolymers, modified ethylene-propylene copolymer, modified ethylene-propylene-α-olefin co-polymers, and
a layer (c) comprising one or more co-polyesters characterized by a % of crystallinity lower than 15, is positioned between the two layers (a) and (b) in such a way that one of the two principal surfaces of layer (c) is directly adhered to layer (a) and the other is directly adhered to layer (b),
an outer layer (d) which comprises one or more heat-sealable polyolefins selected from one or more of ethylene homo-polymers, heterogeneous or homogeneous ethylene-α-olefin copolymers, ethylene-vinyl acetate co-polymers, ethylene-($C_1$-$C_4$) alkyl acrylate or methacrylate co-polymers, ethylene-acrylic acid co-polymers, and ethylene-methacrylic acid co-polymers,
a core gas-barrier layer (e) between layers (b) and (d) comprising ethylene/vinyl alcohol copolymer,
wherein layers (a), (b), (c), (d), and (e) are fully coextruded together.
2. The multi-layer film of claim 1 which is biaxially oriented.
3. The multi-layer film of claim wherein layer (a) is an outer layer of the film.
4. The oriented film of claim 1 wherein the % of crystallinity of the (co)polyesters employed for layer (a) is higher than 20.
5. The oriented film of claim 1 wherein the % of crystallinity of the co-polyesters employed for layer (c) is lower than 12.
6. The multi-layer film of claim 1 wherein the homo-polyester and/or co-polyester resins of layer (a) have a Tm higher than 220° C.
7. The multi-layer film of claim 1 wherein the homo-polyester and/or co-polyester resins of layer (a) have a Vicat softening temperature which is higher than 110° C.
8. The multi-layer film of claim 1 wherein the co-polyester resins of layer (c) have either no detectable Tm or a Tm lower than 200° C.
9. The multi-layer film of claim 1 wherein the co-polyester resins of layer (c) have a Vicat softening point lower than 110° C.
10. The multi-layer film of claim 1 which is heat-shrinkable.
11. The multi-layer film of claim 1 which is heat-set.
12. The multi-layer film of claim 1 wherein the one or more co-polyesters of layer (c) comprises glycolised co-polyester PETG.
13. A packaged food comprising a package comprising the film of claim 1 enclosing a food.

14. A process of making a film comprising:

coextruding together layers (a), (b), (c), (d), and (e) to form a fully coextruded film, wherein layer (a) comprises one or more homo-polyesters and/or copolyesters characterized by a % of crystallinity higher than 15, layer (b) comprises one or more polyolefin-based adhesive resins selected from one or more of ethylene-unsaturated acid copolymers, ethylene-unsaturated ester copolymers, modified polyethylene homopolymer, modified ethylene-α-olefin copolymers, modified ethylene-vinyl acetate copolymers, modified ethylene-alkyl (meth)acrylate copolymers, modified ethylene-(meth)acrylic acid copolymers, modified ethylene-propylene copolymer, modified ethylene-propylene-α-olefin co-polymers, layer (c) comprises one or more co-polyesters characterized by a % of crystallinity lower than 15, wherein layer (c) is positioned between layers (a) and (b) in such a way that one of the two principal surfaces of layer (c) is directly adhered to layer (a) and the other is directly adhered to layer (b), layer (d) is an outer layer which comprises one or more heat-sealable polyolefins selected from one or more of ethylene homo-polymers, heterogeneous or homogeneous ethylene-α-olefin copolymers, ethylene-vinyl acetate co-polymers, ethylene-($C_1$-$C_4$) alkyl acrylate or methacrylate co-polymers, ethylene-acrylic acid co-polymers, and ethylene-methacrylic acid co-polymers, and layer (e) is a core gas-barrier layer between layers (b) and (d) comprising ethylene/vinyl alcohol copolymer.

15. The process of claim 14 further comprising biaxially orienting the fully coextruded film.

16. The process of claim 14 further comprising heat-setting the biaxially oriented film.

17. The process of claim 14 wherein the % of crystallinity of the (co)polyesters employed for layer (a) is higher than 20 and the % of crystallinity of the co-polyesters employed for layer (c) is lower than 12.

18. The process of claim 14 wherein the homo-polyester and/or co-polyester resins of layer (a) have a Tm higher than 220° C. and the co-polyester resins of layer (c) have either no detectable Tm or a Tm lower than 200° C.

19. The process of claim 14 wherein the homo-polyester and/or co-polyester resins of layer (a) have a Vicat softening temperature which is higher than 110° C. and the co-polyester resins of layer (c) have a Vicat softening point lower than 110° C.

20. The process of claim 14 wherein the one or more co-polyesters of layer (c) comprises glycolised co-polyester PETG.

* * * * *

UNITED STATES PATENT AND TRADEMARK OFFICE
CERTIFICATE OF CORRECTION

| | |
|---|---|
| PATENT NO. | : 8,273,447 B2 |
| APPLICATION NO. | : 12/087320 |
| DATED | : September 25, 2012 |
| INVENTOR(S) | : Forloni |

It is certified that error appears in the above-identified patent and that said Letters Patent is hereby corrected as shown below:

Column 16, line 11, the phrase "layer (b)" should be -- a layer (b) --.

Column 16, line 40, the phrase "claim wherein" should read -- claim 1 wherein --.

Signed and Sealed this
Eighth Day of January, 2013

David J. Kappos
*Director of the United States Patent and Trademark Office*